April 28, 1970 A. ROTH 3,509,476

DIGITAL FREQUENCY AND/OR PHASE MEASURING SYSTEM
HAVING WIDE DYNAMIC RANGE

Filed Oct. 12, 1965 5 Sheets-Sheet 1

INVENTOR.
ALBERT ROTH

BY [signature]
ATTORNEY

INVENTOR.
ALBERT ROTH
BY
ATTORNEY

April 28, 1970 A. ROTH 3,509,476

DIGITAL FREQUENCY AND/OR PHASE MEASURING SYSTEM
HAVING WIDE DYNAMIC RANGE

Filed Oct. 12, 1965 5 Sheets-Sheet 3

INVENTOR.
ALBERT ROTH

BY Martin L. Kaeh
ATTORNEY

April 28, 1970 A. ROTH 3,509,476

DIGITAL FREQUENCY AND/OR PHASE MEASURING SYSTEM HAVING WIDE DYNAMIC RANGE

Filed Oct. 12, 1965 5 Sheets-Sheet 4

INVENTOR.
ALBERT ROTH

BY

ATTORNEY

April 28, 1970 A. ROTH 3,509,476

DIGITAL FREQUENCY AND/OR PHASE MEASURING SYSTEM HAVING WIDE DYNAMIC RANGE

Filed Oct. 12, 1965 5 Sheets-Sheet 5

INVENTOR.
ALBERT ROTH

BY

ATTORNEY

United States Patent Office 3,509,476
Patented Apr. 28, 1970

3,509,476
DIGITAL FREQUENCY AND/OR PHASE MEASURING SYSTEM HAVING WIDE DYNAMIC RANGE

Albert Roth, San Diego, Calif., assignor to General Dynamics Corporation, a corporation of Delaware Filed Oct. 12, 1965, Ser. No. 495,066
Int. Cl. H03b 3/04
U.S. Cl. 328—134 13 Claims

ABSTRACT OF THE DISCLOSURE

A system for digitizing the frequency of a data signal is described. A synchronous generator responsive to a clock signal and the data signal produces a data pulse train which is synchronous with the clock signal and has a frequency equal to the frequency of the data signal. A reference pulse train also synchronous with the clock signal is produced having a reference frequency. Logic circuits are provided in each of a data and reference channel which are mutually responsive to the data and reference pulse trains so as to effect cancellation of different pulses in the respective trains in accordance with their sequence of occurrence so as to produce a third pulse train which has a frequency which is equal to the difference between the frequency of the data and reference pulses. This third pulse train appears at the output of different ones of the channels in accordance with the sense of the frequency difference.

The present invention relates to digital systems and particularly to systems for digitizing information as to the frequency or phase of signals.

The invention is especially adapted for use in systems for tracking targets, such as missiles, satellites and space craft, by deriving digital information as to the velocity and/or range of the target. In such tracking systems the Doppler frequency shift between a transmitted radar signal and the return signal is a measure of the velocity of the target. A digitizer embodying the invention is suitable for use in providing digital information respecting the velocity of the target. This information may also be used to derive the range of the target in response to such frequency shift. This digital information may be also used as an input to the radar system for tracking the target.

Inasmuch as the target velocity is subject to large excursions, for example between some negative value in the case of an approaching target to over 36,000 ft./sec. in the case of a vehicle moving at escape velocity, the frequency shift may vary over a large dynamic range. Moreover, it is desirable that the velocity information be extremely accurate. The attendant dynamic range of the frequency measurement is therefore relatively large and may be of the order of several megacycles per second, depending on the transmission frequency and the target velocity. While frequency measuring apparatus is available which is responsive to such a large dynamic range of frequency or phase shift, such available systems are complex and expensive, particularly when high resolution (i.e. accuracy) and/or dynamic frequency range is required.

Systems in accordance with the invention for digitizing frequency information are also generally suitable for use in such applications as: (a) digital frequency difference measurement, (b) analog to digital conversion, (c) telemetry, and (d) radar instrumentation. In addition, the invention is useful in any application where a digital output representing the frequency or phase relationship between two signals, for example, an unknown signal and a reference signal or two unknown signals, is required.

Accordingly, it is an object of the present invention to provide an improved digital system for processing frequency and/or phase information.

It is a further object of the present invention to provide an improved system for digitizing the frequency or phase relationship of two signals so as to provide an output indication of which of the signals is higher or lower in frequency than the other.

It is a still further object of the present invention to provide an improved digital frequency measuring instrument which is less complex and lower in cost than systems of the type which are available and requires little or no calibration or adjustments.

It is a still further object of the present invention to provide an improved system for digitizing frequency or phase information which is operative over a large dynamic range and to a high degree of resolution.

It is a still further object of the present invention to provide a digital system especially adapted for use in measuring the phase shift of an input signal with respect to a reference signal in which analog elements are substantially eliminated.

Briefly described, a digital system embodying the invention responds to two input signals, for example, a data signal of variable frequency which may be derived from the radar return of a Doppler tracking radar and a reference or clock signal. A generator responsive to a clock signal and the data signal produces a first pulse train which is synchronous with the clock signal and has a frequency equal to the frequency of the data signal. A reference pulse train, synchronous with the clock signal, is also produced which has a given or reference frequency. A pair of signal channels is provided for the passage of the reference pulse train and the data pulse train. Data processing circuits in each channel are mutually responsive to the data and reference pulse trains in such a manner as to effect cancellation of different pulses in the respective trains in accordance with their sequence of occurrence so as to produce a third pulse train which has a frequency which is equal to the difference between the frequency of the data and reference pulse trains. This third pulse train appears at the output of different ones of the channels in accordance with the sense of the frequency difference.

By counting the pulses in the train over a predetermined number of clock signal periods (viz. a certain time interval) a digital output may be obtained which is related to the measured frequency difference. By increasing the number of signal channels and by utilizing a higher frequency clock frequency, the frequency difference measurement may be made to fractional parts of a cycle of the data signal or to the phase theref. Also, by totalizing the pulses, as in a counter, an output number indicative of total phase shift of the data signal with respect to the reference signal may be obtained and used to compute the range of a target. The computation of oscillator drift may similarly be made in a phase measurement system.

The invention itself, both as to its organization and method of operation, as well as additional objects and advantages thereof will become more readily apparent from a reading of the following description in connection with the accompanying drawings in which.

Figure 1:
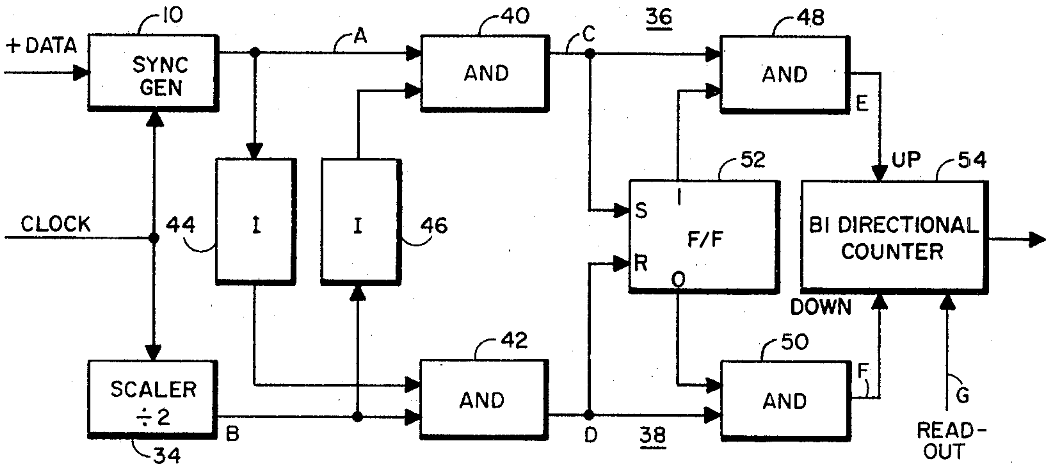
FIG. 1 is a block diagram of a system for digitizing frequency information, which system embodies the invention.

Referring more particularly to FIG. 1, there is shown a system which compares the frequency of a data signal which may be received from a Doppler radar tracking system, with the frequency of a fixed reference signal. This reference signal is a clock signal which is in the form of a pulse train. The data signal which may also be in the form of a pulse train is applied to one input of a synchronous generator 10. (Sine wave signals may be used if desired.) The clock pulse train is applied to another input of the synchronous generator 10. The clock pulse train is higher in frequency than the maximum expected frequency of the data pulse train, for example, the clock pulses may be twice the frequency of the expected mean frequency of the data pulses. The synchronous generator 10 synchronizes the input data pulses and provides an output pulse for each input data pulse, which output pulse is coincident with the leading edge of the first clock pulse that appears after occurrence of the data pulse. Inasmuch as the clock frequency is higher than the maximum data pulse frequency, one and only one output pulse is generated by the generator 10 for each data pulse.

Figure 3:
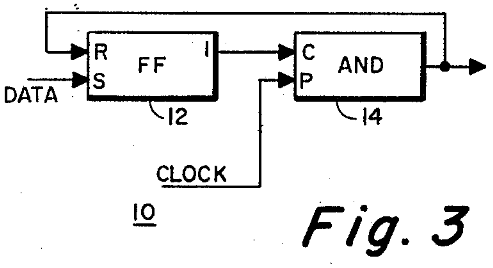
FIG. 3 is a schematic diagram of a synchronous generator circuit which may be used in the system shown in FIG. 1.

The synchronous generator 10 is illustrated in detail in FIG. 3 as including a flip-flop 12 and a pulse type AND gate 14. The pulse type AND gate 14 has A.C. coupling and steering circuits of known design which prevent the gate from passing a pulse applied to its pulse input unless an enabling level is already present at the gate's enabling or conditioning input. Pulse splitting of the clock pulses is therefore prevented by the gate 14. Each data pulse sets the flip-flop 12. The "1" output of the flip-flop enables the AND gate 14 so that the next-occurring clock pulse which is applied to the input of the AND gate 14 is transmitted therethrough as an output pulse from the generator 10. This output pulse is also fed back and resets the flip-flop 12. Other synchronous generators to be described hereinafter may also be used, and may be preferred in cases where the dynamic range of the data frequency is very large. The flip-flop 12 desirably has a fast response so that it resets before the arrival of the next clock pulse. Also the clock pulse width is desirably less than one-half of the clock pulse period.

Returning to the detector system shown in FIG. 1, it will be observed that the clock pulses are divided in frequency by a scaler circuit 34 to produce a reference pulse train which has a frequency equal to one-half the frequency of the clock pulses. In an exemplary tracking system the frequency deviation resulting from Doppler shift may be about ±1.0 mc./s. In order to obtain high resolution, it is desirable to multiply the Doppler return by a factor, say four, to obtain a maximum deviation of ±4 mc./s. A multiplier may be used to provide a data signal of 5 mc./s.±4 mc./s. The data input to the digital system of FIG. 1 may therefore vary between 1 mc./s. and 9 mc./s. A 10 mc./s. clock pulse frequency may be used. This clock pulse frequency may be divided by two in the scaler 34 to provide a frequency equal to the mean frequency of the data signal or 5 mc./s.

The system includes a data pulse transmission channel 36 and a reference pulse transmission channel 38, the former channel 36 transmitting the data pulse train provided at the output of the synchronous generator 10 and latter channel 38 transmitting the reference pulse train provided by the scaler 34. AND gates 40 and 42 are included in the channels 36 and 38, respectively. The synchronous generator output is applied to the AND gate 42 through an inverter 44 and the scaler 34 output is applied to the AND gate 40 through another inverter 46. Coincident pulses produced by the synchronous generator 10 and the scaler 34, respectively, inhibit the gates 40 and 42. Accordingly, pulses arriving simultaneously at both inputs of either the gate 40 or the gate 42 are effectively cancelled and do not appear at the output thereof.

AND gates 48 and 50 are included in the data pulse channel 36 and in the reference pulse channel 38. The AND gate 48 receives inputs from the "1" outputs of a flip-flop 52, and the AND gate 50 receives an input from the "0" output thereof. The flip-flop 52 is set by output pulses from the data pulse channel 36 and reset by pulses from the reference pulse channel. The gates 48 and 50 and the flip-flop 52 provide a logic circuit which responds to the sequence in which pulses appear in the channels 36 and 38. If the data frequency is higher than the reference frequency, a pulse train having a frequency equal to the difference between the frequency of the data pulses and the reference pulses is produced at the output of the data pulse channel 36. The logic circuit, including the gates 48 and 50 and the flip-flop 52 also produces, at the output of the reference pulse channel 38, a pulse train having a frequency equal to the difference between the frequency of the reference and data pulses when the reference pulse frequency is higher than the data pulse frequency.

The output pulses are applied to the up and down inputs of a bi-directional counter 54. This counter may be read out periodically at intervals related to the clock pulse frequency. For example, a 10 c./s. output pulse derived by scaling or dividing the clock pulse may read out the counter each 10th second. Accordingly, the number registered in the counter at the end of a 10th of a second represents the frequency difference in cycles per second, multiplied by a factor of 10. This digital readout may be displayed on a digital indicator or converted by a digital to analog converter into analog form for display. In either case the readout may be used in controlling the radar system to continuously track a target. The counter may also be used to totalize pulses to calculate range if desired.

Figure 2:
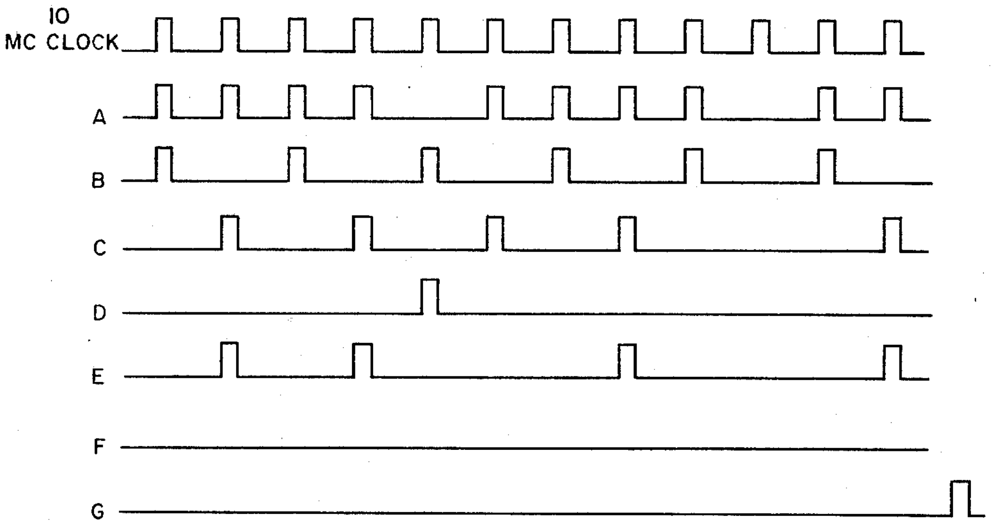
FIG. 2 is a series of waveforms which represent signals appearing at different points in the system shown in FIG. 1.

The operation of the system may be better understood with reference to FIG. 2. The data pulse train which is produced by the synchronous generator 10 is shown in waveform A and is coincident with the leading edge of the first clock pulse that appears after the positive-going or leading edge of the data input signal. In this example, the data frequency is 0.8 that of the clock frequency. Waveform B shows the reference pulse train which is produced by dividing the clock pulse frequency by a factor of two. The reference pulses may be shaped by suitable pulse shaping circuits (not shown) to be of duration equal to the duration of the data pulses at the synchronous generator 10 output and coincident with the leading edge of the clock pulses. The AND gates 40 and 42 are inhibited when the reference and data pulses, shown in waveforms A and B, are coincident with each other. Accordingly, the output of the AND gate 40, shown in waveform C, includes the data pulses which are not coincident with reference pulses and the output of the AND gate 42 (waveform D) are the reference pulses which are not coincident with the data pulses.

It is assumed, for purposes of illustration, that the flip-flop is in its reset or "0" state. The first data pulse (waveform C) which arrives, then sets the flip-flop 52. Due to the delay in the flip-flop 52, the first data pulse is not transmitted by the AND gate 48 because the flip-flop is in its reset state when the first data pulse arrives thereat. The next data pulse, however, is transmitted by the AND gate 48 and is shown in waveform E. The pulse which immediately follows the data pulse is a reference pulse (waveform D) and resets the flip-flop. The reference pulse is not passed through the AND gate 50 inasmuch as the delay in the flip-flop 52 prevents the AND gate 50 from becoming enabled while the reference pulse persists. Data pulses which occur after the reference pulse are similarly inhibited from passing through the AND gate 48 because of the delay in the flip-flop 52. Accordingly, if the data pulse frequency is higher than the reference pulse frequency, as is the case illustrated in FIG. 2, no reference pulses are gated through the AND gate 50 or enter the down input of the counter 54. Each data pulse which immediately follows a reference pulse is cancelled. Simultaneously-occurring data and reference pulses are also cancelled. The cancellation of the data pulses and reference pulses occurs by virtue of their synchronism, inasmuch as the reference and data pulses are all synchronous with the clock pulses. It therefore follows that the pulses will enter the up input of the counter and will have a frequency equal to the difference between the data frequency and the reference frequency.

It will be observed that if the reference frequency is higher than the data pulse frequency, only the reference pulse channel 38 will transmit output pulses which enter the down input of the counter 54. Because of the cancellation of alternate data and reference pulses by the flip-flop 52, the input to the counter 54 cannot exceed the reference pulse frequency. Available low speed counters may therefore be used. The readout pulse as shown in waveform G is synchronized with the trailing edge of a clock pulse. Synchronous relationship between the readout pulse and the clock pulse does away with the need for synchronizing circuits in the counter which would otherwise be necessary to prevent readout during the occurrence of an up or down input pulse.

Figure 4:
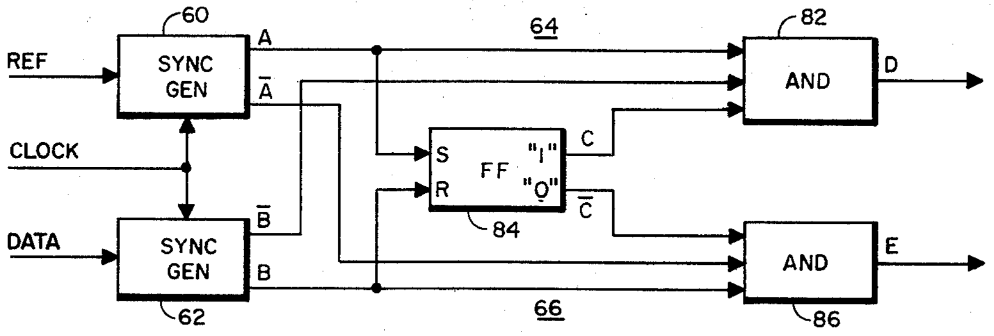
FIG. 4 is a block diagram of a digital system embodying the invention which derives digital information with respect to the frequency difference between a pair of signals.

FIG. 4 illustrates another system for digitizing information respecting the frequency of two signals so as to produce an output corresponding to the difference frequency therebetween. The two signals are indicated as a reference signal and a data signal. Any two signals may be digitized by the system, either or both of which may be variable in frequency. The signals are applied to the system in the form of pulse signals or sine waves, whichever is desirable. A clock signal in the form of a pulse train is also applied as an input to the system.

The system includes a first synchronous generator 60 to which the reference signals are applied and a second identical synchronous generator 62 to which the data signals are applied. The clock pulses are applied simultaneously to both synchronous generators. The synchronous generators convert the input signal thereto to a pulse which is synchronous with the applied clock pulse. Each synchronous generator has a pair of complementary outputs which are applied to a reference pulse channel 64 and a data pulse channel 66. An output of the synchronous generator 60, which is the complement of the output applied to the reference channel, is applied to the data channel. Similarly the output of the second generator 62 which is the complement of the output thereof applied to the data channel is applied to the reference channel.

Figure 5:
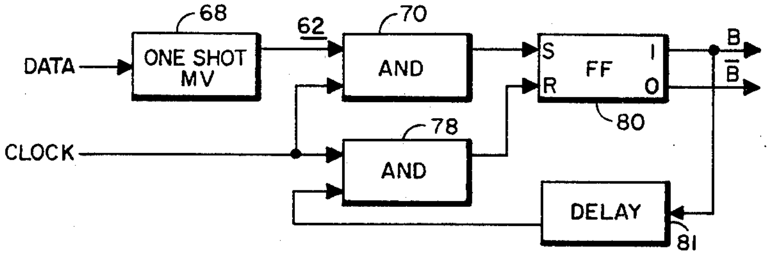
FIG. 5 is a block diagram of one of the subsystems shown in FIG. 4.

The synchronous generator 62 is shown in FIG. 5. As noted above, this generator 62 and the generator 60 are identical. The data signal is applied to a one-shot multivibrator 68 which produces a pulse, the leading edge of which is coincident with the positive-going cross-over of the data signal and the duration of which is somewhat greater than the clock pulse period (viz the interval between successive clock pulses). A pulse amplifier which provides an output pulse having a period greater than the period of the clock frequency may be used instead of the multivibrator 68, if desired. The output of the multivibrator 68 is applied to an AND gate 70 together with clock pulses having a duration which is short as compared to the period thereof. The clock pulse is transmitted through the AND gate if it coincides with the "on" state of the one-shot multivibrator. Accordingly, one pulse will be gated out of the AND gate 70 for each data pulse or cycle of the data signal.

The clock pulse is also applied to an AND gate 78. The output of the AND gate 78 is fed to the reset input of a flip-flop 80. The AND gate 78 is also enabled by the "1" output of the flip-flop, which output is produced when the flip-flop is set, after a delay slightly longer than the duration of the clock pulse which is inserted by a delay network 81. The flip-flop is set by the output of the AND gate 70.

In operation, the flip-flop is set coincident with the leading edge of the first clock pulse which occurs after the one-shot multivibrator output pulse is produced. The delayed "1" output of the flip-flop is fed back to the AND gate 78 and enables that gate to pass a pulse corresponding to the leading edge of the next clock pulse. Accordingly, the flip-flop is reset at the end of each clock pulse period. Thus the flip-flop puts out one pulse for each data pulse or cycle of the data signal, and this flip-flop output has the same width as the period of the clock pulse. The flip-flop provides two complementary outputs, indicated at B and $\overline{B}$. The multivibrator 68 insures that no more than one output pulse will be provided per data input pulse.

Returning to FIG. 4, it will be observed that the reference channel 64 includes an AND gate 82 to which the output of the first synchronous generator 80 is applied, together with the complementary output of the second synchronous generator 62. A flip-flop 84 is also provided which is set by the output of the synchronous generator 60. The "1" output of the flip-flop is applied to the AND gate 82. The data channel 66 includes an AND gate 86 which receives the "0" output from the flip-flop 84, as well as the output of the synchronous generator 62 and the complementary output of the first synchronous generator 60. The flip-flop 84 is reset by the output of the synchronous generator 62 which is also applied to the AND gate 86. A bi-directional counter, similar to the counter 54 (FIG. 1) may receive up inputs from the data channel output which are passed by the AND gate 86 and down inputs from the reference channel output which are passed by the AND gate 82. The bi-directional counter may be read out by a pulse synchronous to the clock pulses in the same manner as the counter 54, or by an internal read-out clock. Inasmuch as a counter is used in the system of FIG. 4 in a manner similar to its use in FIG. 1, the counter is not shown in FIG. 4.

Figure 6:
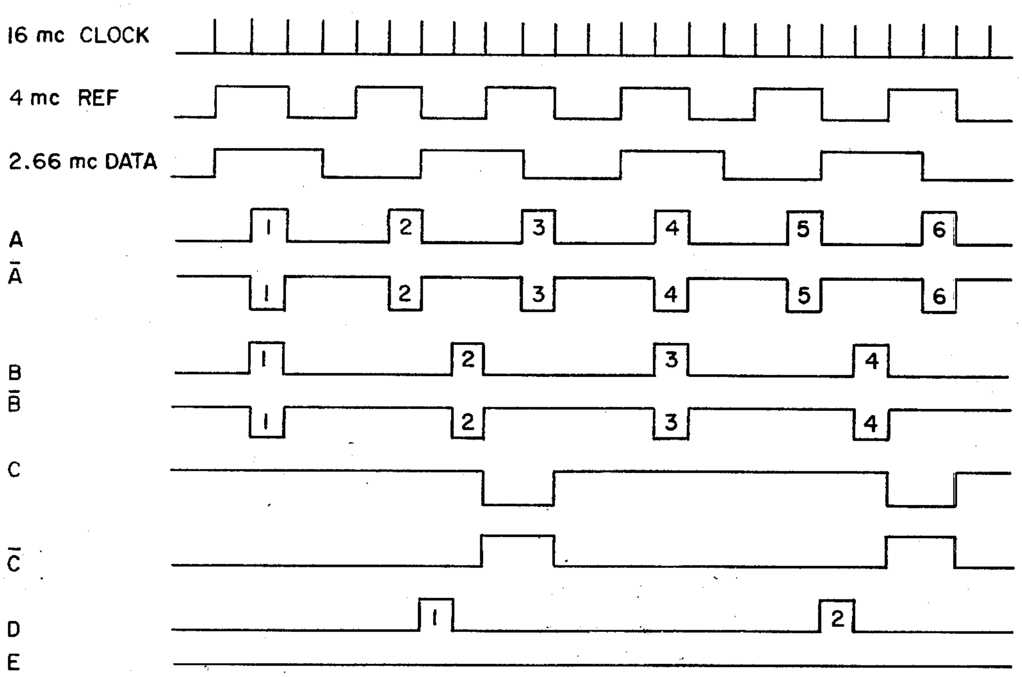
FIG. 6 is a series of waveforms of signals which appear at various points in the system, shown in FIG. 4.

The operation of the system will be more apparent from the waveforms of FIG. 6 which are drawn for the exemplary case where the clock pulses are repetitive at 16 mc./s. and the reference pulses are higher in frequency than the data pulses. Reference pulses of 4 mc./s. and data pulses of 2.66 mc./s. are chosen for purposes of explanation. The first clock pulse that arrives after the reference pulse sets the flip-flop 80 within the synchronous generator 60, and the next clock pulse resets that flip-flop. Pulse trains A and $\overline{A}$ of opposite polarity are therefore generated by the synchronous generator 60 and applied to the reference channel 64 and to the data channel 66. The width of the pulses is equal to the clock pulse period. Inasmuch as the synchronous generators used in the system of FIG. 4 provide output pulses equal to the clock pulse period, the clock pulse frequency is at least twice as great as the maximum expected data pulse frequency.

The other synchronous generator 62 generates one pulse for each data pulse. Trains of these pulses B and $\overline{B}$ are shown in FIG. 6. The leading edges of the first B and $\overline{B}$ pulses (labeled 1) are coincident with the leading edge of the first clock pulse which arrives after the data pulse at the input of the synchronous generator 62 and the lagging edges of these synchronous generator 62 output pulses B–1 and $\overline{B}$–1 are coincident with the leading edge of the next succeeding clock pulse.

The outputs A and B from the reference and data channels 64 and 66, respectively, set and reset the flip-flop 84 to provide the pulses C at the "1" output terminal of the flip-flop 84 and the complementary pulses $\overline{C}$ at the "O" output terminal of the flip-flop 84. It is assumed in the waveforms that the flip-flop 84 is initially set. The flip-flop 84 is also designed so that pulses appearing simultaneously at its set and reset inputs will not change its state. Pulses labeled A–1 and B–1 occur simultaneously; therefore, the flip-flop remains in its initial set state. Since the $\overline{A}$–1 and $\overline{B}$–1 pulses are applied to the AND gates 82 and 86, these gates are inhibited and do not pass the first pulses A–1 and B–1 of the reference pulse train. Similarly other simultaneously occurring data and reference pulses are cancelled.

The second pulse in the reference pulse train A–2 is produced between the first and second clock pulses following the onset of the second reference pulse, and is gated through the AND gate 82, since the flip-flop 84 is in its set or "1" state and the C output is high. Inasmuch as the delays through each logic element are a clock pulse period, the pulses which are generated at any point in the system are always synchronous with the clock pulses. The one clock pulse period delay prevents that pulse which sets or resets the flip-flop 84 from being gated through the AND gates 82 and 86 and also insures that the propagated pulses appear at the inputs of the logic elements simultaneously with the clock pulses.

The next data pulse B–2 which is produced by the generator 62 resets the flip-flop 84 upon occurrence of the lagging edge thereof. Since the flip-flop 84 was set during the time of occurrence of the B–2 pulse, thereby inhibiting the AND gate 86, the second pulse is not transmitted by the AND gate 86 and does not appear in the output E of the AND gate 86.

The next occurring pulse is the third reference pulse A–3. This pulse is operative to again set the flip-flop 84 at the trailing edge thereof. The third reference pulse A–3 also is blocked or cancelled and does not appear in the output D since the flip-flop 84 "1" output C is low and inhibits the AND gate 82. Each pulse in train A which follows a preceding pulse in train B will be similarly cancelled at the output D. Also, a pulse in train B which immediately follows a reference pulse is cancelled and does not appear in the data channel output pulse train E. If two or more successive pulses appear in one of the channels without an intervening pulse in the other channel, except for simultaneously occurring pulses, all except the first will be transmitted to the output of the channel in which the successive pulses appear.

In the waveforms illustrated in FIG. 6, where the data pulse frequency is less than the reference pulse frequency, each pulse in the data channel will be blocked at the AND gate 86, and no output pulses appear at the output E. The pulses which appear in the reference channel output D will have a frequency which is equal to the difference in frequency between the frequency of the data and reference pulses. Simultaneously occurring pulses, such as pulses A–1 and B–1 are cancelled and do not affect the frequency difference. Since data pulse B–3 is cancelled, pulses A–3 and A–5 occur without an intervening pulse in the data channel 66, and an output pulse D–2, corresponding to reference pulse A–5 is produced. The output pulses may be applied to a bi-directional counter which may be readout every sixteen clock pulses to produce a number corresponding to the frequency difference in megacycles.

Figure 7:
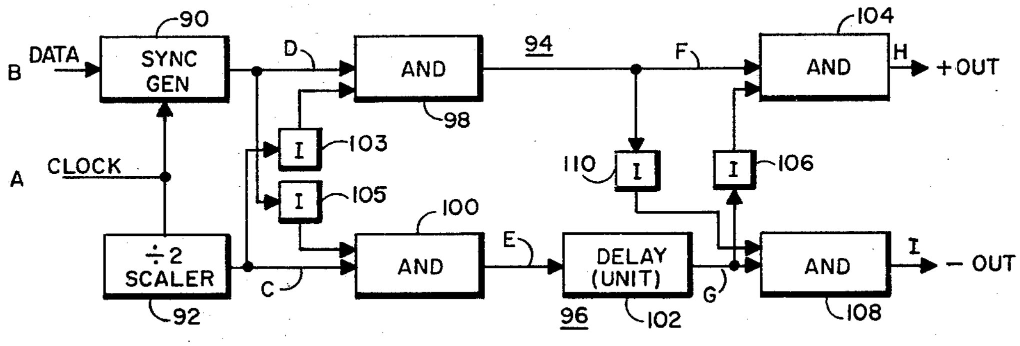
FIG. 7 is a block diagram of a digital system for measuring the frequency of a data signal with respect to a clock system, which system is in accordance with another embodiment of the invention.

Another system for digitizing frequency information, which embodies the invention is shown in FIG. 7. The data signal is applied to a synchronous generator 90 which may be similar to the synchronous generator shown in FIG. 3. It is desirable, however, that the output pulse produced by the synchronous generator 90 have the same duration as the clock pulses which are applied thereto. Thus the width of the output data pulses from the synchronous generator are desirably the same as the width of the clock pulses. The clock pulse width should be less than one-half the clock pulse period in order to permit the generator 90 to produce pulses at a rate higher than one-half the clock pulse rate.

The reference pulses are provided by a scaler circuit 92, which divides the clock frequency by two. A data pulse channel 94 and a reference pulse channel 96 are also provided. These channels include logic circuits consisting of AND gates 98 and 100 and inverters 103 and 105 which are similar to the AND gate 42 and inverters 44 and 46 shown in FIG. 1, and function to prevent the transmission of simultaneously-occurring data and reference pulses as was the case for AND gate 40 and 42 and inverters 44 and 46 of FIG. 1.

The channels 94 and 96 also include a system of circuits for cancelling the transmission of pulses to the output of the channel which carries the lower frequency pulse train and for transmitting all but the first of a series of successive pulses in one channel which occur without an intervening pulse in the other of the channels except for a pulse therein which occurs simultaneously with a pulse in the one channel. These circuits include a delay unit 102 which may be a one-shot multivibrator which produces an output pulse delayed one clock pulse period after input pulses which are applied thereto. The delayed pulses also have the same duration as the clock pulses (viz less than one half a clock pulse period). An AND gate 104 is included in the data pulse channel and receives inputs from the AND gate 98. Another input to the AND gate 104 is obtained from the reference pulse channel at the output of the delay unit 102 by way of an inverter circuit 106.

Another AND gate 108 is disposed similarly with the AND gate 104 at the output of the reference pulse channel. This AND gate receives inputs from the delay unit 102 and from the data pulse channel by way of an inverter 110. By virtue of the use of inverters 106 and 110, the data pulses are applied to the reference channel output AND gate 108 and reference pulses are applied to the data channel output AND gate 104 but inverted in phase. A bi-directional counter (not shown) may be provided. The up inputs of the counter may receive outputs from the data channel, and the down inputs may receive outputs from the reference channel. The counter may be readout by a pulse synchronized with the clock pulse so that a digital output directly related to the difference between the data and reference pulses may be produced as was previously described.

Figure 8:
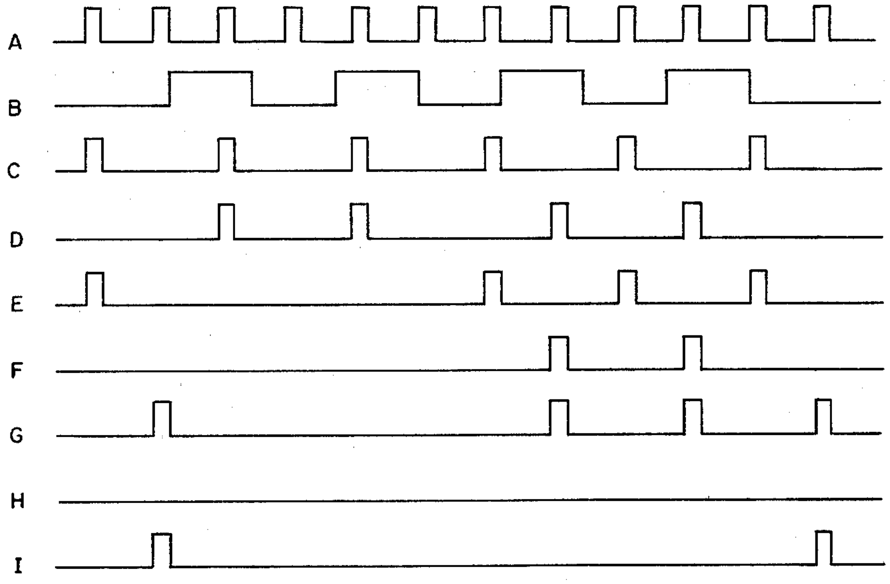
FIG. 8 is a block diagram of the various waveforms which appear at various points in FIG. 7.

The operation of the system of FIG. 7 may be more clearly understood from the waveforms of FIG. 8. In these waveforms it is assumed that the frequency of the data input pulses (waveform B) is lower than the frequency of the reference pulses (waveform C). The clock pulses which have twice the frequency of the reference pulses are shown in waveform A. The synchronous generator 90 produces output pulses which are synchronous with the clock pulses, but not with all of the reference pulses. The data and reference pulses which are synchronous with each other are cancelled at the AND gates 98 and 100, inasmuch as the inverters 103 and 105 inhibit these gates, and prevent transmission of the simultaneous data and reference pulses. The data pulses, (D) absent any pulses which are synchronous with the reference pulses (C), are shown in waveform F. The reference pulses, (C) absent any pulses which are synchronous wfth the data pulses, are shown in waveform E. The delay unit 102 delays the reference pulses (E) one clock pulse period to produce the delayed reference pulses shown in waveform G. It will be noticed that the circuit including the AND gates 104 and 108 and the inverters 106 and 110 are similar to the synchronous pulse cancellation circuits, including the AND gates 98 and 100. Accordingly, synchronously occurring data pulses (F) and delayed reference pulses (G) will be cancelled.

The pulses which appear at the outputs are those which are not cancelled by the calcellation networks in the channels. Inasmuch as both the data and the reference pulses are synchronous with the clock pulses and have the same duration as the clock pulses, a pulse in the data channel 94 always precedes a pulse in the reference channel or vice versa by one clock pulse period. In the case where the reference pulses are higher than the frequency of the data pulse, all of the data pulses will be blocked and do not appear in waveform H at the output of AND gate 104. However, the reference channel output pulses appear in waveform I at the output of the AND gate 108. The latter pulses have frequency equal to the difference in frequency between the data and reference pulses. It will therefore be noted that the difference frequency is represented by the frequency of the output pulses, and the sense of such difference frequency is indicated by the output (either the data channel output or the reference channel output) at which the pulses appear. The bi-directional counter accordingly receives only inputs on one side thereof until the sense of the difference changes The time between the application of successive pulses on alternate inputs of the counter is therefore substantially greater on average than the time between successive pulses which are applied to a single input of the counter. Low cost counters which may not be responsive to closely spaced pulses applied alternately to different inputs thereof may therefore be used without fear of error in the count registered therein. It will be noted that the foregoing advantage also inheres to all of the above described systems. Another feature of the system is that the pulses may be recorded directly as on a magnetic tape recorder for later reference. The pulses in each channel output directly represent the difference frequency without resort to additional computations.

Figure 9:
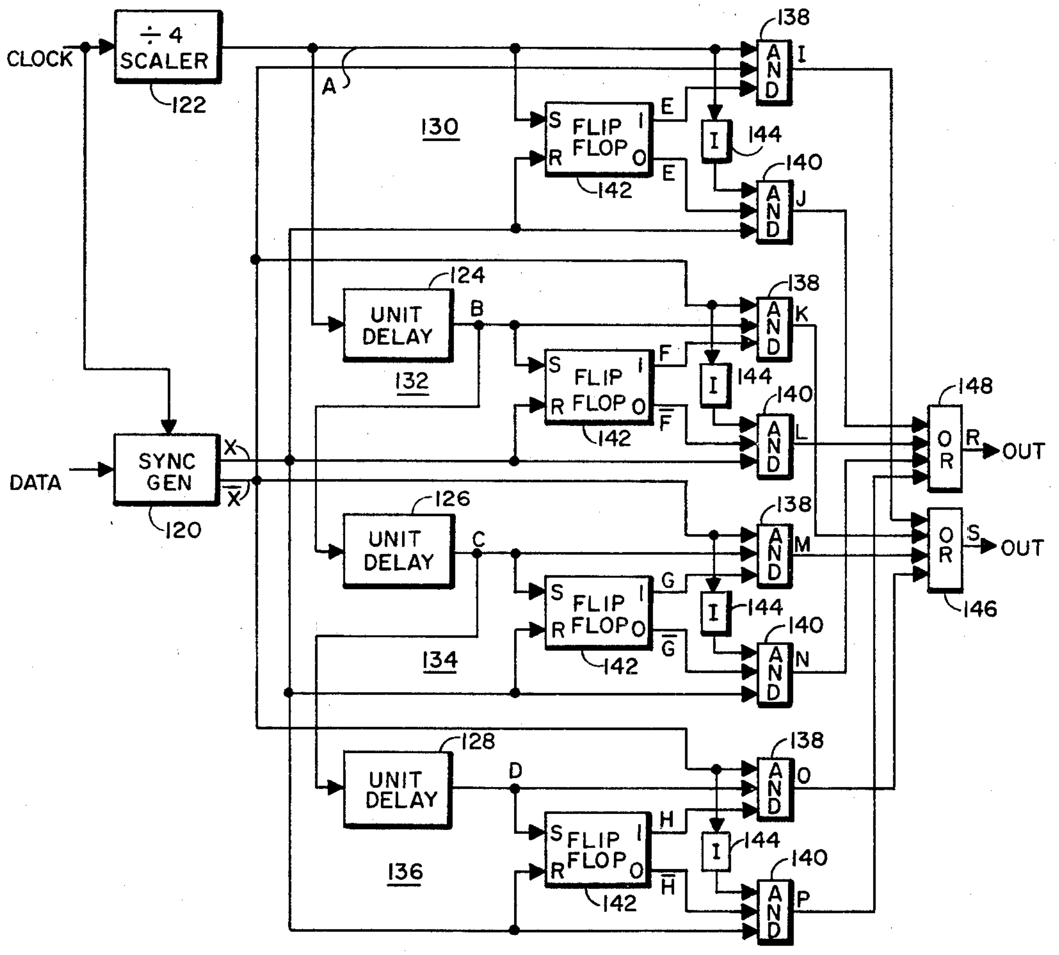
FIG. 9 is a digital system for measuring the phase relation of an unknown signal with respect to a known signal, which system also embodies the invention.

A system for digitizing the phase relationship as well as the frequency relationship between two signals is shown in FIG. 9. The phase relationship between signals is indicated as fractional cycles of frequency. Accordingly, the system of FIG. 9 may be called a fractional cycle digitizer or detector.

The data signals are applied to a synchronous generator 120 which may be similar to the synchronous generator 62 described in connection with FIG. 5. Both of the complementary outputs of the flip-flop of this synchronous generator 120 are used. The clock pulses are also applied to the synchronous generator 120. Desirably, these clock pulses should have a frequency which is related to the nominal frequency of the data signals and the number of fractions of a cycle to which the frequency difference is desired to be calculated. In the illustrated case, it is desired to calculate the frequency difference to one quarter cycle. Accordingly, the clock frequency should be at least four times greater than the nominal or mean data input frequency. For example, if the mean data input frequency is 5 mc./s. (viz the frequency may vary from 1 mc./s. to 9 mc./s.), a clock frequency of 20 mc./s. is suitable. A scaler 122, which may be a two stage binary divider, divides the clock frequency by four. The reference signal is effectively phase split into four parts by three unit delay circuits 124, 126 and 128, such as delay lines or oneshot multivibrators. These circuits delay the pulses applied thereto by one clock pulse period.

The output of the scaler 122 is applied to a first digitizing unit 130 which corresponds to the first quarter cycle of the frequency difference to be calculated. The output of the unit delay 124 provides reference pulses to a unit 132 for digitizing the second quarter cycle of the frequency difference. The unit delay 126 provides reference pulses to a unit 134 for digitizing the third quarter cycle of the frequency difference. Finally, the unit delay 128 provides reference signals to a unit 136 which digitizes the fourth and last quarter cycle of the frequency difference which is to be calculated. Each channel also receives a different complementary output of the synchronous generator 120. These outputs are applied to AND gates 138 and 140 in each of the units. Each unit also includes a flip-flop 142, and an inverter 144. The inverter applies the complement of the reference pulse to the lower channel flip-flop 140 in each unit.

The synchronous generator 120, the output AND gates 132 and 140, and the flip-flop 142 are connected in a manner similar to the synchronous generator 62, AND gates 82 and 86, and flip-flop 84, as shown in FIG. 4. The inverter 144 provides the complementary input to the data channel output AND gates in a manner similar to the complementary output ($\overline{A}$) of the synchronous generator 60 in the system of FIG. 4. In this connection, it may be noted that another signal may be used instead of a clock to provide the reference pulses, by multiplication of the reference frequency to a multiple of the nominal or mean input data frequency, depending upon the number of channels which are used. The reference channel outputs of all of the units are applied as inputs to an OR gate 146. The data channel outputs of each of the units are similarly applied as inputs to another OR gate 148.

Figure 10:
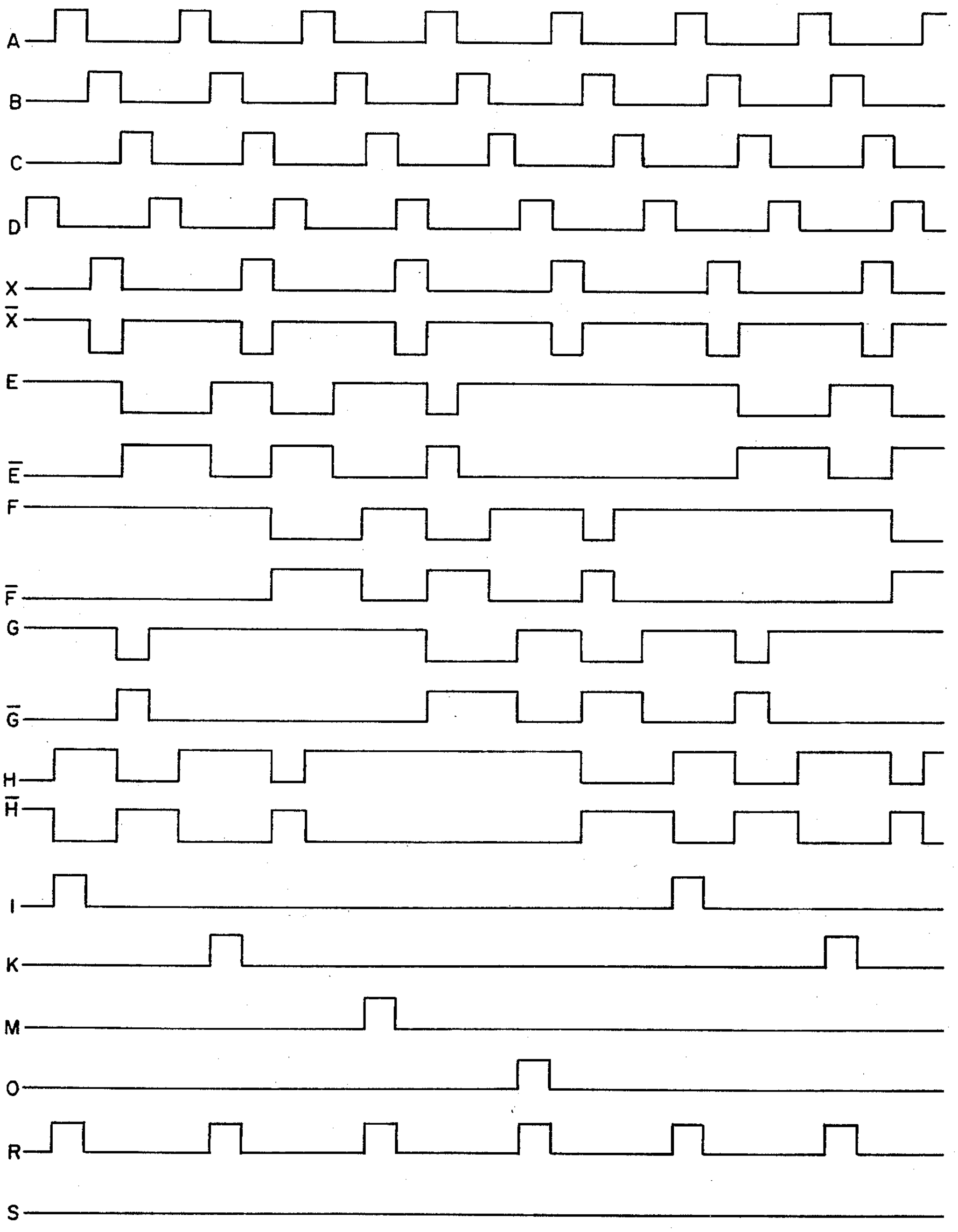
FIG. 10 is a series of waveforms of signals which appear at various points in the system of FIG. 9.

The operation of the system may be better understood from the waveforms of FIG. 10, which represent the case where the data frequency is lower than the reference frequency, for example, the data pulses occurring at 4 mc./s. and the reference pulses at the output of the scaler 122 at 5 mc./s. The reference pulses which are applied to the units 130, 132, 134 and 136 are respectively shown in waveforms A, B, C and D. Waveforms X and $\overline{X}$ respectively show the complementary outputs of the synchronous generator 120. The flip-flops 142 in the units 130, 132, 134 and 136 are respectively set and reset by the data pulses and reference pulses which are applied to their respective units. Waveforms E and $\overline{E}$ represent the outputs of the flip-flop in the unit 130; waveforms F and $\overline{F}$ represent outputs of the flip-flop in the unit 132; waveforms G and $\overline{G}$ represent the outputs of the flip-flop in unit 134; and H and $\overline{H}$ represent the outputs of the flip-flop in 136. The AND gates 138 and 140 in each unit cause mutual cancellation of synchronously occurring data and reference pulses. The flip-flop outputs insure the cancellation of each data pulse which immediately follows a non-simultaneously occurring reference pulse or vice versa.

Since the reference pulses are located in time to correspond to successive 90° segments of each cycle of the difference frequency, the reference and data channel outputs I and J for the unit 130 (first 90°); K and L for the unit 132 (second 90°); M and N for the unit 134 (third 90°); and O and P for the unit 136 (fourth 90°) produce pulses depending upon whether the data pulses or the reference pulses lag or lead each other during the respective 90° segments. In the illustrated case the data and reference pulses are regularly recurring, and the reference pulses all lead the data pulses during their respective 90° segments. Accordingly, outputs J, L, N and P from the data channels are not produced. Only outputs I, K, M and O are produced, each at a successive 90° segment of the cycle of a signal having frequency equal to the difference in frequency between the data and reference pulses. These outputs, I, K, M and O, are gated by the OR gate 148. Accordingly, four pulses are produced for each cycle of the one megacycle frequency difference signal. These pulses may be applied to a bi-directional counter and read out in the manner heretofore discussed, or recorded on tape for subsequent playback. It will be observed that as the phase relationship between the reference and data pulses changes, the frequency of the pulses at the output of the OR gate 148 (or the OR gate 146 in the event that the data pulses were higher in frequency than the reference pulses) will change.

Additional units may be used if greater resolution of the phase relationship between the data and reference signals is desired. For example, if a resolution of ten pulses per cycle is desired, ten channels, a clock frequency ten times the nominal data frequency and a divide-by-ten scaler may be used.

From the foregoing description, it will be apparent that there has been provided improved information handling apparatus capable of digitizing information respecting the frequency and phase relationship between signals. The disclosed systems have various applications, including use in phase-locked loops of missile and satellite tracking radar systems. In such applications, direct digital control of the tracking system may be provided. In addition, the digital information may be used directly or indirectly to indicate the velocity or rate or range of the missile being tracked. While four embodiments of the invention have been described, variations thereof and modifications therein within the spirit of the invention will undoubtedly suggest themselves to those skilled in the art. Accordingly, the foregoing description should be taken as illustrative and not in any limiting sense.

What is claimed is:

1. A system for deriving a digital output corresponding to the difference in frequency between the frequency of a first signal and a given frequency, said system comprising:
- (a) a source of clock signals,
- (b) means responsive to said clock signals and said first signals for providing a first pulse train synchronous with said clock signals and having a frequency equal to the frequency of said first signal,
- (c) means responsive to said clock signals for providing a second pulse train synchronous therewith and having said given frequency,
- (d) first and second system outputs, and
- (e) means responsive to said first and second pulse trains for respectively producing a third pulse train having a frequency equal to the difference between the frequency of said first and second pulse trains at one of said first and second outputs, depending upon the sense of said difference.

2. A system for deriving a digital output corresponding to the difference in frequency between the frequency of a first signal and a given frequency, said system comprising:
- (a) a source of clock signals,
- (b) means responsive to said clock signals and said first signals for providing a first pulse train synchronous with said clock signals and having a frequency equal to the frequency of said first signal,
- (c) means responsive to said clock signals for providing a second pulse train synchronous therewith and having said given frequency,
- (d) a first channel for transmitting said first pulse train and a second channel for transmitting said second pulse train, and
- (e) means included in each of said channels and mutually responsive to signals passing through both of said channels for respective producing at the outputs of said first and second channels a third pulse train having a frequency equal to the difference between the frequency of said first and second pulse trains, said third pulse train being produced at said first output, and said second output respectively when said first output frequency is higher than said second pulse train frequency and when said second pulse train frequency is higher than said first train pulse frequency.

3. A system for deriving a digital output corresponding to the difference in frequency between the frequency of a first signal and a given frequency, said system comprising:
- (a) a source of clock signals,
- (b) means responsive to said clock signals and said first signals for providing a first pulse train synchronous with said clock signals and having a frequency equal to the frequency of said first signal,
- (c) means responsive to said clock signals for providing a second pulse train synchronous therewith and having said given frequency.
- (d) a first channel for transmitting said first pulse train and a second channel for transmitting said second pulse train, and
- (e) means included in each of said channels and mutually responsive to signals being transmitted by both of said channels for providing a third pulse train having a frequency which is dependent upon the sequence of occurrence of pulses in said first pulse train with respect to the pulses in said second pulse train, said third pulse train having a frequency equal to the difference between the frequency of said first and second pulse train and being provided at the output of one of said first and second channels, depending on the sense of said difference.

4. A system for deriving a digital output corresponding to the difference in frequency between the frequency of a first signal and a given frequency, said system comprising:
- (a) a source of clock signals,
- (b) means responsive to said clock signals and said first signals for providing a first pulse train synchronous with said clock signals and having a frequency equal to the frequency of said first signal,
- (c) means responsive to said clock signals for providing a second pulse train synchronous therewith and having said given frequency,
- (d) first and second channels for respectively transmitting said first pulse train and said second pulse train, and
- (e) means included in both of said channels for blocking pulses of said first pulse train which immediately follows pulses in said second pulse train without the intervening occurrence of other pulses in said first train except for pulses simultaneously occurring in both of said trains and for blocking the transmission of pulses in said second pulse train which immediately follow pulses in said first pulse train without the intervening occurrence of pulses in said first pulse train except for pulses simultaneously occurring in both said trains whereby to provide at the output of one of said first and second channels a third pulse train having a frequency equal to the difference of said first and second pulse train frequencies.

5. A system for deriving a digital output corresponding to the difference in frequency between the frequency of a first signal and the frequency of the second signal comprising:
- (a) a source of clock signals,
- (b) means responsive to said clock signals and said first signal for providing a first pulse train synchronous with said clock signals,
- (c) means responsive to said clock signals and said second signal for providing said second pulse train synchronous with said clock signals and having a frequency equal to the frequency of said second signal,
- (d) first and second channels for respectively transmitting said first and second pulse trains, and
- (e) means in said first and second channels mutually responsive to the sequence of occurrence of said synchronous first and second signals for providing a third pulse train at the output of one of said first and second channels having a frequency equal to the frequency difference between said first pulse train and said second pulse train, said third pulse train being provided at said first and second channel outputs, depending upon the sense of said frequency difference.

6. A system for deriving a digital output corresponding to the difference in frequency between the frequency of a first signal and a given frequency, said system comprising:

(a) a source of clock signals, (b) means responsive to said clock signals and said first signal for providing a first pulse train synchronous with said clock signals and having a frequency equal to the frequency of said first signal, (c) means responsive to said clock signals for providing a second pulse train synchronous therewith and having said given frequency, (d) first and second channels for respectively transmitting said first pulse train and said second pulse train, (e) means responsive to both of said pulse trains for blocking the transmission through said channels of pulses in said first pulse train which occurs simultaneously with pulses in said second pulse train, (f) means included in both of said channels for blocking pulses of said first pulse train which immediately follows pulses in said second pulse train without the intervening occurrence of other pulses in said first train and for blocking the transmission of pulses in said second pulse train which immediately follow pulses in said first pulse train without the intervening occurrence of pulses of the said first pulse train whereby to provide at the output of one of said first and second channels a third pulse train having a frequency equal to the difference of said first and second pulse train frequencies, (g) a bi-directional counter having a pair of inputs for respectively receiving signals which cause the counters to count in opposite senses, said inputs being respectively connected to said first channel output and said second channel output, and (h) means for reading out said counter synchronously with certain of said clock signals.

7. A system for deriving a digital output corresponding to the difference in frequency between the frequency of a first signal and a given frequency, said system comprising:

(a) a source of clock signals, (b) a synchronous generator responsive to said clock signals and said first signals for providing a first pulse train synchronous with clock signals and having a frequency equal to the frequency of said first signal and having a period which is integrally related to the period of said clock signals, (c) a frequency divider responsive to said clock signals for providing a second pulse train synchronous therewith and, having said given frequency, and having the same duration as said clock signals, (d) first and second channels for respectively transmitting said first pulse train and said second pulse train, (e) means responsive to both of said pulse trains for blocking the transmission through said channels of pulses in said first pulse train which occurs simultaneously with pulses in said second pulse train, and (f) means included in both of said channels for blocking pulses of said first pulse train which immediately follows pulses in said second pulse train without the intervening occurrence of other pulses in said first train except for second train pulses blocked by said blocking means and for blocking the transmission of pulses in said second pulse train which immediately follow pulses in said first pulse train without the intervening pulses of the said first pulse train except for first train pulses blocked by said blocking means whereby to provide at the output of one of said first and second channels a third pulse train having a frequency equal to the difference of said first and second pulse train frequencies.

8. The invention set forth in claim 7, wherein said blocking means includes first and second AND gates respectively in said first and second channels, and means for applying a third pulse train containing pulses which are the complements of said first pulse train to said second AND gate and for applying pulses which are the complements of said second pulse train to said first AND gate.

9. The invention as set forth in claim 8, wherein said first and second AND gates are included in said last named means.

10. The invention as set forth in claim 9, wherein said last named means includes a first AND gate having a plurality of inputs in said first channel, having one of the said inputs connected to said first channel, a second AND gate also having a plurality of inputs and having one of its inputs connected to said first channel, a unit in one of said first and second channels for delaying said first channel input to the one of said AND gates therein by an integral number of clock pulse periods, means for applying the complement of the output of said delaying unit to another input of the AND gate in the other of said first and second channels, and means for applying the complement of the channel input to said other channel AND gate to another input of said one AND gate.

11. A system for deriving a digital output corresponding to the difference between the frequency of a first signal and a given frequency, said system comprising:

(a) a source of clock signals, (b) means responsive to said clock signals and said first signals for providing a first pulse train synchronous with said clock signals and having a frequency equal to the frequency of said first signal, (c) means responsive to said clock signals for providing a second pulse train synchronous therewith and having said given frequency, (d) first and second channels for respectively transmitting said first pulse train and said second pulse train, (e) means responsive to both of said pulse trains for blocking the transmission through said channels of pulses in said first pulse train which occurs simultaneously with pulses in said second pulse train, (f) a first AND gate in said first channel and having one input connected thereto, (g) a second AND gate in said second channel and having one input connected thereto, and (h) a flip-flop having set and reset inputs respectively connected to different ones of said channels and having oppositely valued outputs respectively input connected to different ones of said first and second gates, whereby to provide at the output of one of said first and second gates a third pulse train having a frequency equal to the difference of said first and second pulse train frequencies.

12. A system for deriving digital information respecting the phase relationship between a first signal and a given signal, said system comprising:

(a) a source of clock signals, (b) means responsive to said first signal and said clock signals for generating a first pulse train synchronous with said clock signals and having a frequency equal to the frequency of said first signals, the pulses of said first train having a period integrally related to the period of said clock signals, (c) means responsive to said clock signals for providing a plurality of second pulse trains having the frequency of said given signal and delayed with respect to each other successive fractions of a cycle of said given signal, (d) a plurality of units, each corresponding to a different one of said second pulse trains for digitizing the difference in frequency between said first pulse train and the one of said plurality of said second pulse trains corresponding thereto, (e) each of said units, including a channel for transmitting said first pulse train and a channel for transmitting the one of said second pulse trains corresponding thereto for providing at the output of one of said first and second channels thereof a third pulse train having a frequency equal to the difference between the frequencies of first said pulse train and the one of said second pulse train which is applied thereto, (f) means for providing a first output in response to the first channel outputs of each of said units, and (g) means for providing a second output responsive to the second channel outputs of each of said units.

13. A system for deriving digital information respecting the phase relationship between a first signal and a given signal, said system comprising:

(a) a source of clock signals, (b) means responsive to said first signal and said clock signals for generating a first pulse train synchronous with said clock signals and having a frequency equal to the frequency of said first signals, the pulses of said first train having a period integrally related to the period of said clock signals, (c) a plurality of tandem connected delay devices responsive to said clock signals for providing a plurality of second pulse trains, the pulses or successive ones of which are delayed with respect to each other by said clock signal period, and each of said plurality of second pulse trains having the frequency of said given signal, (d) a plurality of units, each corresponding to a different one of said second pulse trains for digitizing the difference in frequency between said first pulse train and the one of said plurality of said second pulse trains corresponding thereto, (e) each of said units, including a channel for transmitting said first pulse train and a channel for transmitting the one of said second pulse trains corresponding thereto, each of said units further including means responsive to said first pulse train and the one of said second pulse train applied thereto in accordance with the sequence of pulses in said trains for providing at the output of one of said first and second channels thereof a third pulse train having a frequency equal to the difference between the frequencies of first said pulse train and the one of said second pulse train which is applied thereto, (f) means for providing a first output in response to the first channel outputs of each of said units, and (g) means for providing a second output responsive to the second channel outputs of each of said units.

References Cited

UNITED STATES PATENTS

| | | | |
|---|---|---|---|
| 2,858,425 | 10/1958 | Gordon. | |
| 2,985,773 | 5/1961 | Dobbie | 324—79 XR |
| 3,069,623 | 12/1962 | Murgio | 328—134 XR |
| 3,187,195 | 6/1965 | Stefanov | 307—295 |
| 3,235,800 | 2/1966 | Turrell | 328—134 XR |

ARTHUR GAUSS, Primary Examiner

S. T. KRAWCZEWICZ, Assistant Examiner

U.S. Cl. X.R.

307—210, 295; 324—79; 328—141; 343—5, 13